2,867,440
FLOATING REAMER OR TAP HOLDER

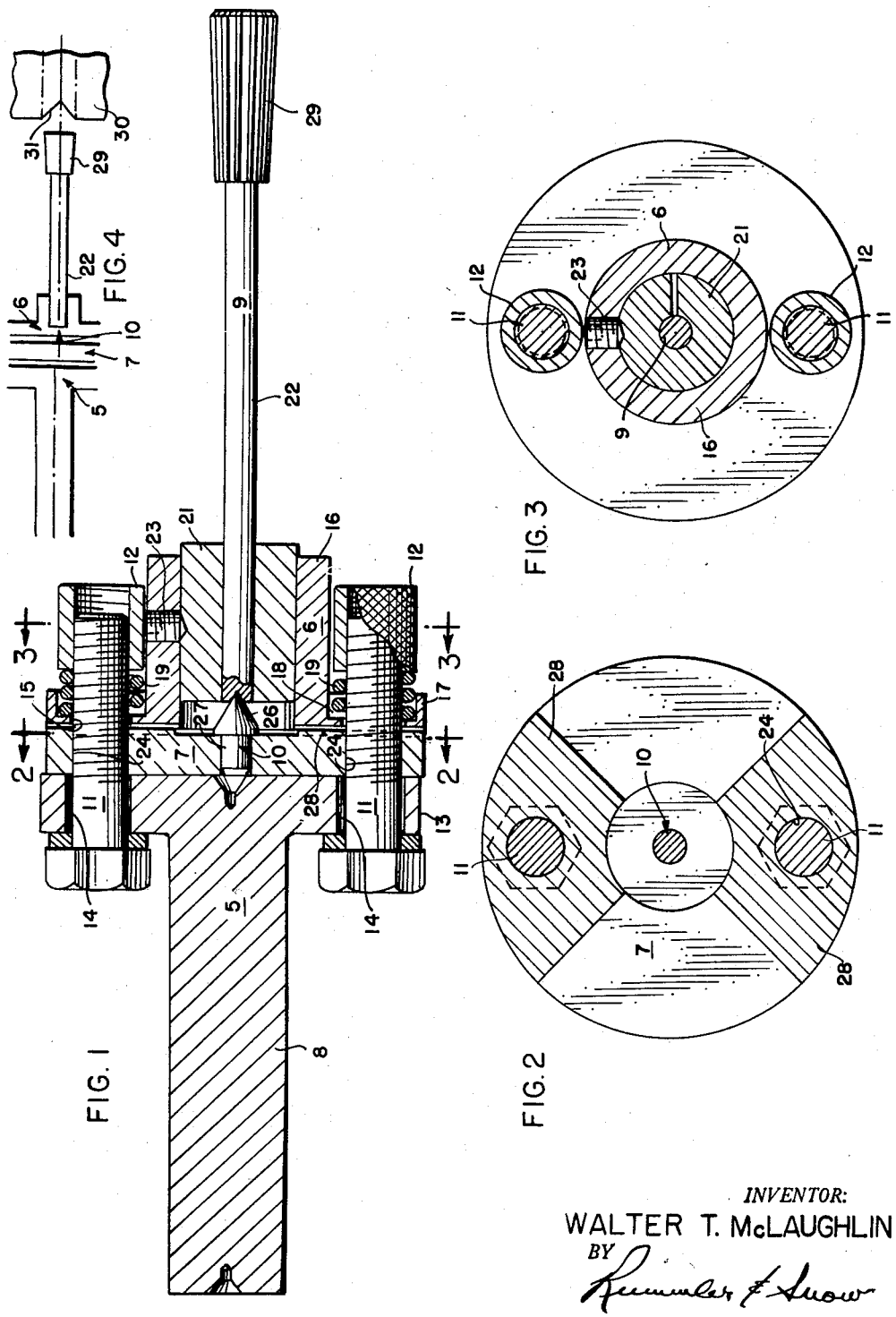

Walter Truman McLaughlin, Chicago, Ill.

Application July 11, 1958, Serial No. 748,020

6 Claims. (Cl. 279—16)

This invention relates to holders for floating reamers or taps.

In turret lathes, hand or automatic screw machines, the tool on the carriage is not always perfectly aligned with the axis of the work in the supporting chuck. This is critical where the work hole has to be reamed or tapped within a specified tolerance. For such operations it becomes necessary to employ a tool holder which will provide a floating support for the tool so as to permit positive axial alignment of the reamer or tap with the work-piece hole so as to insure perfect reaming or threading of the hole. Such holders, as heretofore have been available, have been of complicated and costly construction and many contain inherent limitations to facile and accurate use.

The main objects of this invention, therefore, are to provide an improved form of holder for reamers or taps; to provide an improved tool holder of this kind which permits such radial adjustment of the holder parts as will accurately align the tool with the axis of the work-piece hole regardless of any axial deflection in the alignment of the holder in the carriage and the work piece in the chuck; to provide an improved tool holder of this kind which eliminates weight on the holder end of the tool; to provide an improved holder of this kind which permits a slight relative oscillation of the cutting end of the tool to compensate for the least amount of axial misalignment of the holder and the work-piece hole; and to provide an improved reamer or tap holder of this kind which is simple in construction, economical to manufacture, and facile to use.

In the adaptation shown in the accompanying drawings:

Figure 1 is a longitudinal section of this improved form of tool holder;

Fig. 2 is a transverse section taken on the plane of the line 2—2 of Fig. 1;

Fig. 3 is another transverse section taken on the plane of the line 3—3 of Fig. 1; and Fig. 4 is a diagrammatic view of an exaggerated eccentricity of the axis of the shank of the tool holder and the aligned axes of the tool and the hole in the work-piece.

The essential concept of this invention involves three annular elements, one having a shank for mounting on a turret lathe carriage, a second for clamping the shank of the tool in the tool holder, and the third intermediate element mounting a fixed centering pin, the three elements being connected by a pair of bolts and clamped together in radially-adjusted superimposed relationship to align the centering pin with the work-piece hole and allow a sufficient relative planar tilting of the second and third elements to compensate for any eccentricity of the shank axis and the aligned axes of the centering pin and the work-piece hole during the advance of the tool into the work-piece hole, and thereby insure a reaming or tapping of the work-piece hole within the specified tolerances.

A reamer or tap holder embodying the foregoing concept comprises the three elements 5, 6 and 7, respectively mounting a supporting shank 8, a tool 9, and a centering pin 10 all clamped in radially-adjustable relationship by bolts 11 and nuts 12 so as to position the tool 9 in perfect axial alignment with a hole in a work-piece, regardless of the misalignment of the axis of the shank 8 with the axis of the work-piece hole.

The element 5 is in the nature of a disk 13 integral with the end of the shank 8 and adapted for positioning on a conventional carriage (not shown). At diametrically-opposite points the disk has holes 14 for the reception of the threaded bolts 11. However, as is clear from Fig. 1, the holes 14 are somewhat larger in diameter than the bolts 11. This is to allow for the desired relative radial adjustment of the disk 13 and the element 7, as presently will be explained.

The element 6 is in the nature of a bored hub 16 having an integral annular flange 17 at one end with diametrically-spaced holes 15. One face of the flange 17 is opposed to the intermediate element 7 and the other face, radially of the hub 16, is formed with recesses 18 to seat springs 19, the function of which will be explained later. The hub 16 is bored to receive a split bushing 21 which in turn is bored to receive the shank 22 of the tool 9—reamer or tap. A reaming tool is here shown.

The bushing 21 is of a diameter to easily fit in the bore of the hub 16 where it is retained against axial displacement and compressible by the action of a set screw 23 to firmly clamp the tool-shank 22 to the hub 16 of the element 6.

The element 7 is a disk interposed between the elements 5 and 6 and has threaded holes 24 for the threaded reception of the bolts 11. Obviously, the holes 15 and 24 in the elements 6 and 7 are in substantial registration with the holes 14 in the element 5. The element 7 mounts the fixed centering pin 10 at the center of the element. Such a pin 10 has a conical head 26 on an annular stud 27 which is press fitted into a central aperture in the element 7.

The opposed faces of the elements 6 and 7 have alternate diametrically-opposed raised and depressed quadrants 28, whereby these two elements are keyed against relative rotation. Hence element 7 is stationary and the element 6 can only tilt or wobble about the center point 10.

The nuts 12 are here shown of annular form with knurled exterior surfaces with the intention that they may be easily adjusted on the bolts 11 by the application of force through one's fingers. These nuts 12 permit a requisite tensioning of the springs 19, as will be explained presently.

The tool 9, here shown as a conventional reamer, mounts a cutting head 29 at the end of the long shank 22. As is generally the case with reamers, the axially-disposed cutting edges taper rearwardly slightly from the outer end.

This improved form of tool holder is used in the following manner:

The initial and preliminary action is to mount a drill on the tool-carriage, which ultimately is to hold the shank 8 of the element 5. Concurrently, a piece of blank stock 30 is placed in the machine chuck which later is to support the work-piece that is to be reamed (or tapped). The carriage is then moved up to center-drill a small hole 31 in the work-piece. (See Fig. 4.) This is done to provide a means for subsequently adjusting the elements 5 and 7 to positively align the centering pin 10 with the axis of the work-piece which later is to be reamed (or tapped).

This preliminary action being taken, the carriage is retracted, the drill removed and the shank 8 of the element 5 is mounted on the carriage and clamped in place.

With the nuts 12, springs 19, and the element 6 removed, the bolts 11 are inserted through the holes 14 in the disk 13 of the element 5 and threaded into the holes 24 of the element 7. Thereupon, the tool-supporting carriage (not shown) is moved up toward the preliminarily-drilled piece of blank stock 30 and the conical head 26 of the centering pin 10 is seated in the center-drill hole 31 in this temporary work-piece and held firmly in contact therewith while the bolts 11 are turned to draw the element 7 firmly up against the element 5, as shown in Fig. 1. This closeup positioning of the centering pin 10, in the drilled end of the preliminary work-piece, serves to shift the element 7 relative to the axis of the element 5 so as to locate the axis of the pin 10 in true concentricity with the chuck and with the work-piece hole later to be reamed (or tapped). (Fig. 4.)

The next step is to back off the tool-carriage and successively place the element 6 and the springs 19 and nuts 12 loosely on the bolts 11. The tool 9 and its supporting bushing 21 are then positioned successively one within the other and in the hub 16 of the element 6 and with the axial recess normally at the inner end of the shank 22 of the tool 9 pressed against the conical head 26 of the centering pin 10, the carriage is advanced to press the cutter end 29 of the tool against the center-drilled hole in the blank stock.

Thereupon shims of about .001 to .010 inch in thickness (not here shown) are inserted between the embossed and depressed quadrant-opposed faces of the elements 6 and 7, on diametrically opposite sides thereof, and the nuts 12 are turned up to compress the springs 19 and press the element 6 firmly up against the shims interposed between the elements 6 and 7. Then, the set screw 23 is tightened to secure the tool 9 and its bushing 21 and, upon retracting the carriage and removing the shims, the element 6 becomes capable of planar tilting (or wobbling) on the center point 10 in the event there is any deviation in the axial alignment of the element 5 and the hole to be worked in the rotating work-piece which is to be substituted in the chuck for the original center-drilled blank stock.

As will be obvious from the above explanation, the positioning of the centering pin 10 in the center-drilled preliminary-work-piece hole is made when these parts are closely adjacent. However, when the reaming (or tapping) operation is initiated, the centering pin 10 against which the end of the tool 9 is secured, is quite remote from the entrance end of the hole in the work-piece that is to be reamed (or tapped). If the reaming (or tapping) of the work-piece hole is effected during a non-rotative relative advance of tool and work-piece, no problem of misalignment of tool and work-piece is likely to occur. If, on the other hand, the work-piece is rotated during a relative advance of the tool-holder and there is any deviation in alignment of the axis of the tool-holder shank 5 and that of the work-piece hole it will be compensated for by the planar tilting of the element 6 about the center point 10, and with respect to the element 7 as permitted by the springs 19.

Such a deviation of axial alignment of the pin 10 and the work-piece hole might be occasioned by some slight alteration in the radial distance between the axis of the tool 9 and the plane of the machine bed over which the tool-supporting carriage moves as it advances toward the work-piece. Or, there might be some slight irregularity in the mounting of the tool holder in the movable tool carriage.

The main advantages of this invention reside in the simplicity of its construction and operation; in the relatively low cost of its manufacture because practically no precision parts are required; in the fact that the parts of the tool holder are self-adjusted in the course of assembling the holder for use; in the fact that a free floating action of tool is obtained with a minimum of moving parts; and in the fact that there is no weight of the shank end of the tool which must be radially supported by resilient means.

Although but one specific embodiment of this invention is herein shown and described it will be understood that details of the construction shown may be altered or omitted without departing from the spirit of this invention as defined by the following claims.

I claim:

1. A tool holder comprising, three superimposed disk-like elements the two outer of which elements respectively have oppositely-disposed axial extensions, the extension on one outer element being for mounting on a machine carriage and the other outer element extension having a longitudinal bore to support a tool, diametrically-spaced threaded bolts extending through the three elements outwardly of the extensions and threadedly supported only on the intermediate element for locking together the one outer element and the intermediate element in radially-adjusted relationship, a centering pin fixed on the intermediate element and extending into the bore of the other outer element extension, means for clamping a tool in the said other outer element with one end of the tool concentrically seated on the said centering pin, and nuts threaded on the ends of the bolts for positioning the other outer element on the bolts to retain the end of the tool seated on the centering pin.

2. A tool holder comprising, three superimposed disk-like elements the two outer of which elements respectively have oppositely-disposed axial extensions, the extension on one outer element being for mounting on a machine carriage and the other outer element extension having a bore to support a tool, the three elements having diametrically-spaced registering holes extending therethrough, the holes in the intermediate element only being threaded and the holes in the other elements being slightly larger than the holes in the intermediate element, threaded bolts extending through the holes in the three elements and threadedly supported only on the intermediate element for locking the one outer element and the intermediate element in radially-adjusted relationship, a centering pin fixed on the intermediate element and extending into the bore of the other outer element extension, means for clamping a tool in the said bore with one end of the tool concentrically seated on the centering pin, and nuts threaded on the ends of the bolts for positioning the said other element on the bolts and to retain the end of the tool seated on the centering pin.

3. A tool holder comprising, three superimposed disk-like elements the two outer of which elements respectively have oppositely-disposed axial extensions, the extension on one outer element being for mounting on a machine carriage and the other outer element extension having a bore to support a tool, the three elements having diametrically-spaced registering holes extending therethrough, the holes in the intermediate element only being threaded and the holes in the other elements being slightly larger than the holes in the intermediate element, threaded bolts extending through the holes in the three elements and threadedly supported only on the intermediate element for locking the one outer element and the intermediate element in radially-adjusted relationship, means for keying the other outer element and the intermediate element against relative rotation, a centering pin fixed on the intermediate element and extending into the bore of the other outer element extension, other means for clamping a tool in the said bore with one end of the tool concentrically seated on the said centering pin, nuts threaded on the ends of the bolts for holding the other outer element on the bolts and to retain the end of the tool on the centering pin, and springs interposed between the nuts and the other outer element to permit tilting movement of said other outer element on said centering pin and relative to said intermediate element.

4. A tool holder comprising, three superimposed disk-like elements the two outer of which elements respectively have oppositely-disposed axial extensions, the extension on one outer element being for mounting on a machine carriage and the other outer element extension having an axial bore therethrough to support a tool, the three elements having diametrically-spaced registering holes extending therethrough, the holes in the intermediate element only being threaded and the holes in the other element being slightly larger than the holes in the intermediate element, threaded bolts extending through the holes in the three elements and threadedly supported only on the intermediate element for locking the one outer element and the intermediate element in radially-adjusted relationship, the abutting faces of the other outer element and the intermediate element having alternate interfitting depressed and raised portions keying the elements against relative rotation, a centering pin fixed on the intermediate element and extending into the bore of the other outer element extension, other means for clamping the shank of a tool in the said bore with the end of the tool shank concentrically seated on the centering pin, nuts threaded on the ends of the bolts for positioning the said other outer element on the bolts so as to retain the tool end on the said centering pin, and springs interposed between the said nuts and the other outer element to permit tilting movement of said other outer element on said centering pin and relative to the plane of the intermediate element.

5. A tool holder comprising, three superimposed disklike elements, a supporting a shank integrated with rearward one of the elements, a centrally bored forwardly facing tool-supporting hub integrated with the forward element, the forward face of intermediate element and the opposed face of the said forward element having alternate interfitting depressed and raised portions keying the two elements against relative rotation, the three elements having registering diametrically-spaced holes extending therethrough outwardly of the shank and hub, the holes in the intermediate element only being threaded and the holes in the other elements being slighly larger than the threaded holes in the intermediate element, threaded bolts extending forwardly from the rearward element through the registering holes and threadedly supported only on the intermediate element to lock the rearward element and the intermediate element together in radially-adjusted relationship, a centering pin fixed on the intermediate element in alignment with the bored hub of the forward element, a tool-supporting bushing positioned in the bore of said hub, means for locking the bushing in the hub and clamping the shank of a tool in the bushing with the end of the tool shank seated on the said centering pin, and nuts threaded on on the bolts outwardly of the forward element for positioning the said forward element in face to face relation with the intermediate element and to retain the tool shank end on the said centering pin.

6. A tool holder comprising, three superimposed disklike elements, a supporting shank integrated with the rearward one of the elements, a forwardly facing tool-supporting hub integrated with the forward element and having a bore extending axially therethrough, the forward face of the intermediate element and the opposed face of the forward element having alternate interfitting depressed and raised portions keying the two elements against relative rotation, the three elements having registering diametrically-spaced holes extending therethrough outwardly of the said shank and hub, the holes in the intermediate element only being threaded and the holes in the other elements being of larger diameter than the threaded holes in the intermediate element, threaded bolts extending through the registering holes of the several elements and threadedly supported only on the intermediate element with the bolt heads abutting the external face of the rearward element for locking the said rearward element and the intermediate element in radially-adjusted relationship, a centering pin fixed on the intermediate element and aligned with the bore in the hub of the forward element, means for clamping the shank of a tool in the said bore with the end of the tool shank seated on the centering pin and with the forward element in axially spaced relationship with the intermediate element, nuts threaded on the bolts outwardly of the said forward element for holding the forward element on the bolts and retaining the tool shank end on the centering pin, and resilient means interposed between the nuts and the external face of the forward element to permit tilting of the forward element relative to the plane of the intermediate element.

References Cited in the file of this patent
UNITED STATES PATENTS

| 1,789,830 | Ostlund | Jan. 20, 1931 |
| 2,353,834 | Klute | July 18, 1944 |